UNITED STATES PATENT OFFICE.

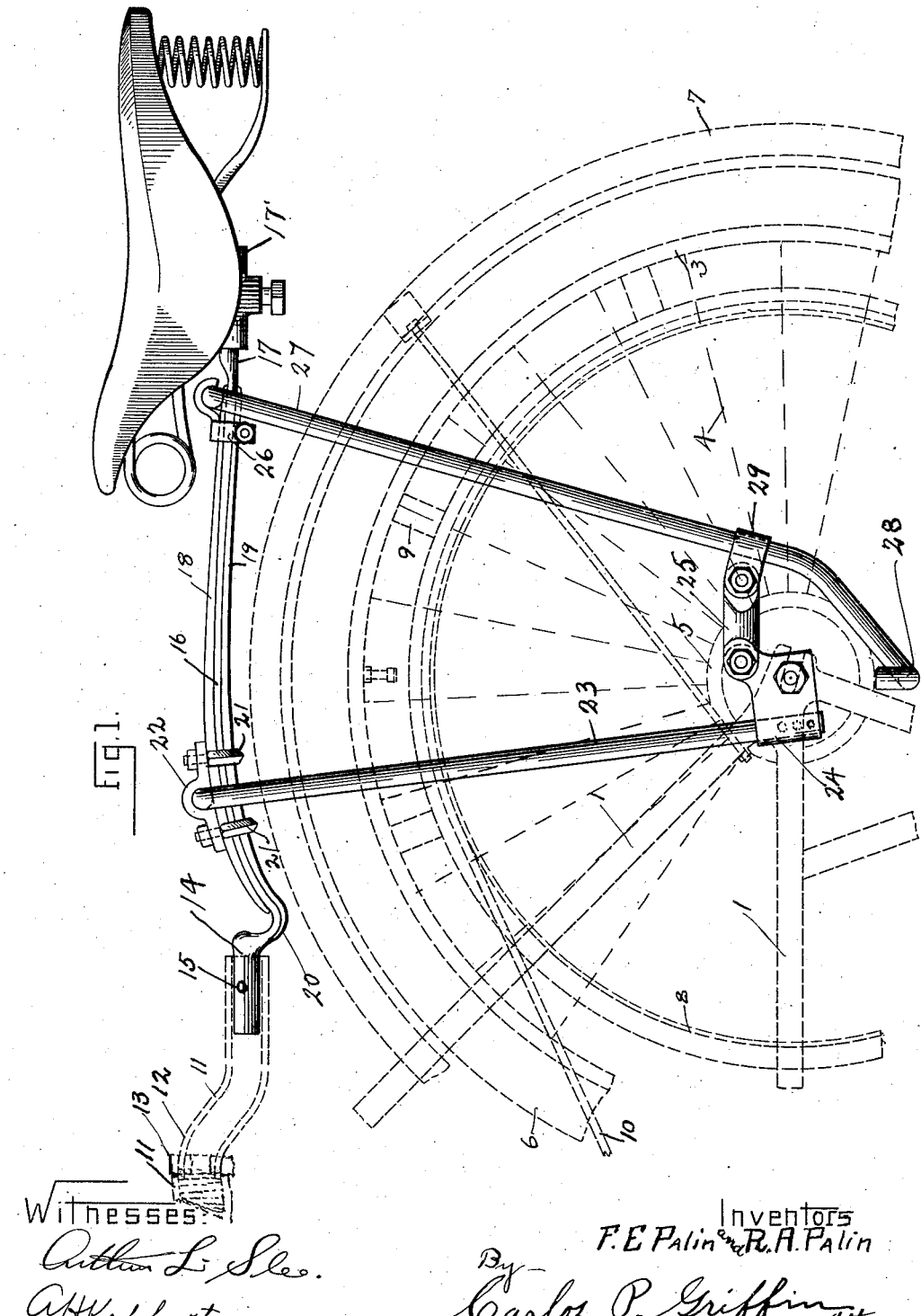

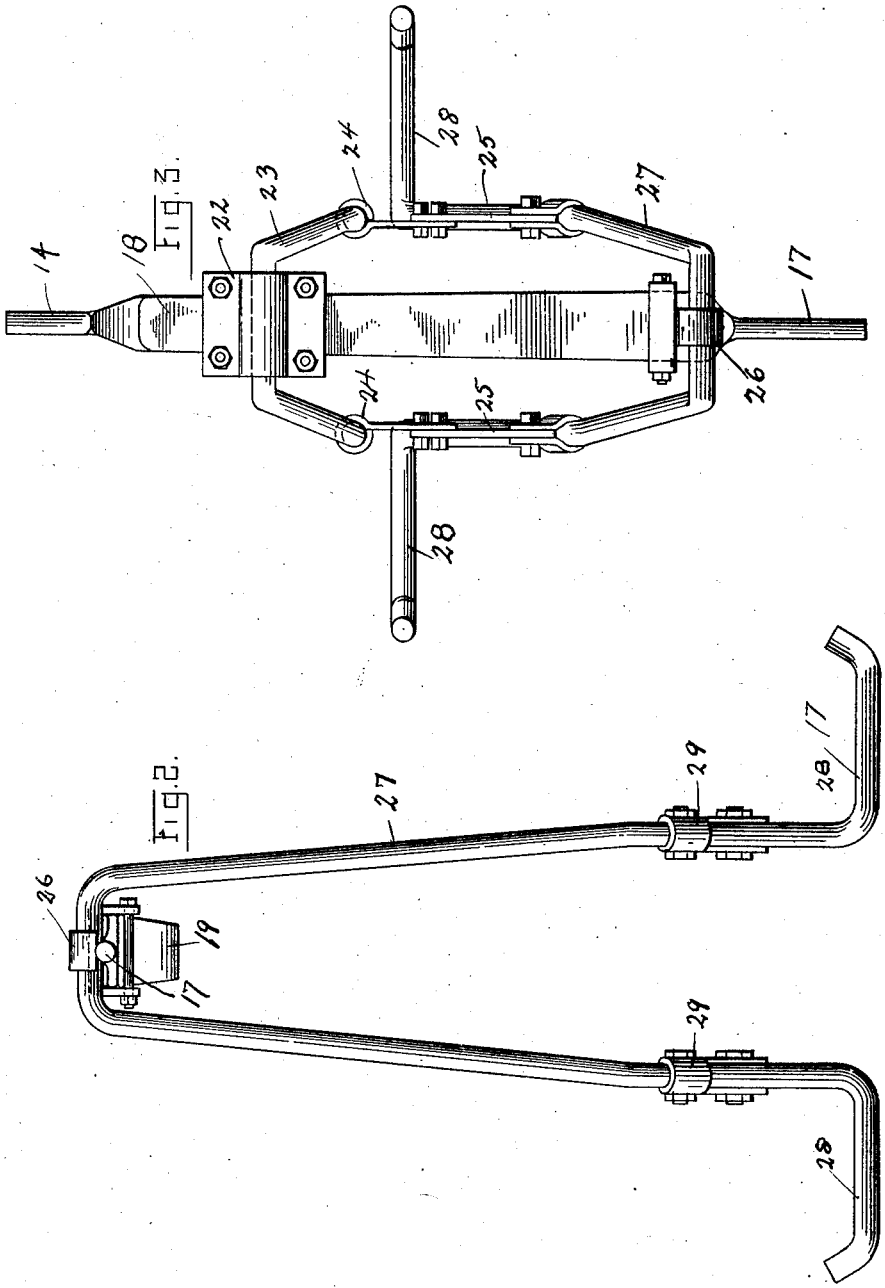

FRANK E. PALIN AND RONALD A. PALIN, OF SAN MATEO, CALIFORNIA.

MOTOR-CYCLE REAR-SEAT SPRING.

1,026,115.   Specification of Letters Patent.   Patented May 14, 1912.

Application filed November 6, 1911. Serial No. 658,642.

*To all whom it may concern:*

Be it known that we, FRANK E. PALIN and RONALD A. PALIN, citizens of the United States, residing at San Mateo, in the county of San Mateo and State of California, have invented a new and useful Motor-Cycle Rear-Seat Spring, of which the following is a specification, in such full and clear terms as will enable those skilled in the art to construct and use the same.

This invention relates to a tandem spring for a motorcycle, the object of which is to so secure the second seat to the motorcycle as to make the same the most comfortable, possible to ride.

An object of the invention is to provide stirrups for the person sitting on the rear seat, which will move with the entire seat thus enabling the rider to be much more comfortable than where no movement of the stirrups is permitted.

Another object of the invention is to produce a spring support which will be protected from breakage, either on a downward thrust or upon an upward movement of the second seat.

Another object of the invention is to provide means whereby the height of the seat may be adjusted to several different sizes of motorcycles as well as means for adjusting the flexibility of the spring to enable light persons to use the same as well as heavy persons.

In the drawings in which the same numeral of reference is applied to the same portion throughout the several views, Figure 1 is a side elevation of a portion of a motorcycle wheel and the frame work of the machine showing the application thereto of the tandem spring. Fig. 2 is a rear elevation of the tandem spring, and Fig. 3 is a plan view thereof.

The numeral 1 represents the frame of the motorcycle, and 3 the rim of the wheel. The wheel is provided with the usual spokes 4 connected with the hub 5, tire 6 and mud guard 7. On the side of the wheel is a large pulley 8 secured to the wheel by means of brackets 9, over which pulley the driving belt 10 passes. At the upper portion of the frame 1, there is shown the rear end of a horizontal bar 11, said bar having a threaded hole therein, in which a heavy tube 12 is threaded, a locknut 13 holding said tube in the proper position. The tube 12 is curved downwardly so that its bore in the rear end lies in the proper plane for the reception of a pin 14 on the front end of the tandem spring. The pin 14 and tube 12 are secured together by means of a pin 15 driven through a hole passing through each of them. The pin 14 is integral with the spring 16, which spring has a projection at 17 for securing the rear seat in place. Above the spring 16 is a leaf 18 and below the spring 16 is a leaf 19, the latter being curved upwardly at the front end as shown at 20, to securely hold it in place. The three springs are secured together by means of two clips 21, said clips holding a strap 22 in place above the springs. This strap 22 has a U shaped yoke 23 passing therethrough, the lower ends of which yoke have holes therein for adjusting the position of the spring with respect to the supporting bracket 24. This bracket 24, one on each end of the yoke 23, is bolted directly to the axle of the rear wheel and it is also bolted to a link 25, which extends rearwardly therefrom, there being one link secured on each bracket 24. At the rear end of the springs there is a clip 26, which clip is suitably secured to said springs to hold them together and its upper portion is crossed over the top of the yoke 27, said yoke having stirrups 28 at the bottom thereof. A clip 29 is secured around each limb of the yoke and is pivotedly secured to the rear end of the link 25.

The result of the above construction is that upon any movement of the rear end of the springs, the stirrups will sink as well as the seat, thus making the riding easier for the person upon the rear seat. But should it be necessary to raise or lower the springs to accommodate machines with larger or smaller wheels, all that is necessary is to shift the position of the lower ends of the yoke 23, up or down as may be necessary. If it is desired to carry a very heavy person, the yoke 23 may be moved to the rear a suitable amount. When so moved to the rear the spring will be stiffer and will not have as much movement with a given load as it has when the yoke 23 is placed nearer the front thereof.

It is, of course, understood that the device may be suitably enameled or nickeled, as may seem necessary to the manufacturer.

Having thus described our invention what we claim as new and desire to secure by Let- ters Patent of the United States is as follows:

1. In a motorcycle tandem attachment, a leaf spring, means to secure said spring near one end to the frame of the motorcycle, a yoke having foot rests secured to the rear end of the spring and pivoted links connected to the frame of the motorcycle and to the yoke, to permit said yoke to vibrate with said spring, substantially as described.

2. In a motorcycle tandem attachment, a leaf spring having means at one end to secure the same to the frame of the motorcycle and a projection at the opposite end for securing a seat thereto, leaf springs secured to the aforesaid spring above and below the same, a yoke connected to the spring and having stirrups at its lower ends and pivoted links connected to the frame of the machine and to said stirrup yoke for permitting vibration of said stirrups with the spring, substantially as described.

3. In a motorcycle tandem attachment, a spring having means at one end to secure the same to a motorcycle and a projection at the other end for securing a seat thereto, leaf springs above and below said spring, a yoke having stirrups at the lower end thereof and secured to the end of said spring, clips secured to said yoke and links pivotally connecting said yoke to said motorcycle frame for permitting vibration of said springs, substantially as described.

4. In a motorcycle tandem attachment, a motorcycle frame, a spring having a projection at each end, the former to secure the spring to a motorcycle frame and the latter to secure a seat to, a yoke to connect the spring and the frame at the front end of the former, and adjustable longitudinally of the spring, a yoke supported on the rear end of the spring and having stirrups at the lower end and pivoted links connecting said frame and said yoke adjacent the stirrups, substantially as described.

5. In a motor cycle tandem attachment, a motor cycle frame, a spring secured to said frame, a seat on said spring, a yoke having stirrups depending from said spring, links connected to said yoke, and a bracket secured to the frame of the machine to which the links are pivoted, substantially as described.

In testimony whereof we have hereunto set our hands this 21st day of October A. D. 1911, in the presence of the two subscribed witnesses.

FRANK E. PALIN.
RONALD A. PALIN.

Witnesses:
JOSEPH B. GORDON,
JOHN JOHNS.